(No Model.)
E. L. FARRELL.
FRYING PAN OR SIMILAR UTENSIL.
No. 391,524. Patented Oct. 23, 1888.
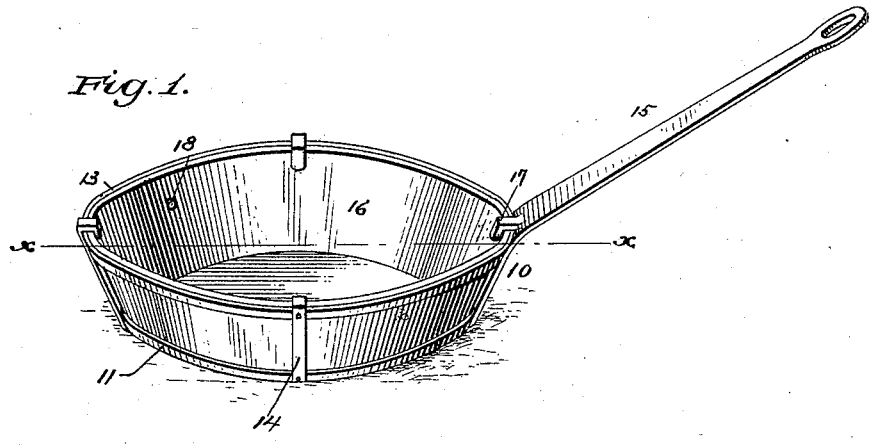
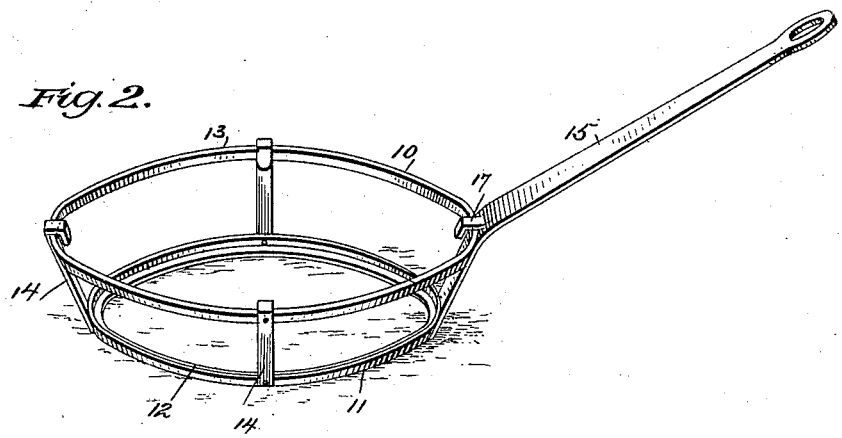
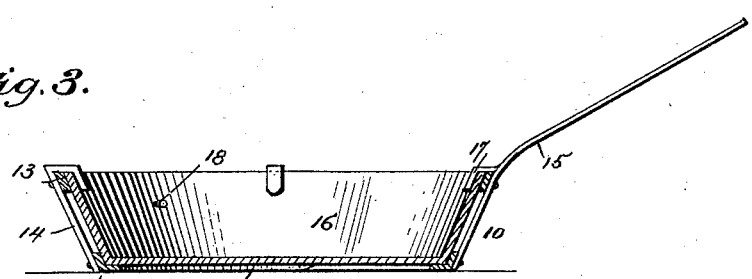
WITNESSES:
N. R. Davis.
C. Sedgwick.
INVENTOR:
E. L. Farrell.
BY Munn & Co
ATTORNEYS.

UNITED STATES PATENT OFFICE.

EMMA L. FARRELL, OF BROOKLYN, NEW YORK.

FRYING-PAN OR SIMILAR UTENSIL.

SPECIFICATION forming part of Letters Patent No. 391,524, dated October 23, 1888.

Application filed June 6, 1888. Serial No. 276,178. (No model.)

*To all whom it may concern:*

Be it known that I, EMMA L. FARRELL, of Brooklyn, in the county of Kings and State of New York, have invented a new and useful Improvement in Frying-Pans and Similar Utensils, of which the following is a full, clear, and exact description.

My invention relates to an improvement in frying-pans and similar utensils, and has for its object to provide a means whereby the frame of the pan may be held stationary and the body of the pan revolve over the fire, so that the said fire may be brought equally in contact with all portions of the bottom.

The invention consists in a frame, a pan or body revolubly held in said frame, and in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a perspective view of the complete device. Fig. 2 is a perspective view of the frame, the pan proper being removed; and Fig. 3 is a diametrical section on line $x\ x$ of Fig. 1.

In carrying out the invention the frame 10, which is of that character ordinarily known as a skeleton frame, consists of a lower base-ring, 11, having an interior annular attached or integral flange, 12, an upper or larger ring, 13, supported a proper distance above the lower ring, and a series of vertical braces, 14, which braces are connected, respectively and preferably, to the outer side or periphery of the upper and lower rings, whereby the said rings are held in position, as best illustrated in Fig. 2. A handle, 15, is attached at the base, and also to the outer surface of the said rings, being adapted to project outwardly at an inclination from the upper ring.

The braces 14 and the handle 15 may be attached to the several rings through the medium of rivets, or in any other approved or well-known manner known to the trade. The upper ends of the braces 14 are adapted to project beyond the upper edge of the top ring.

A handleless pan, 16, which may be constructed of any suitable material, is adapted to the inner contour of the frame, and made to loosely fit therein and rest upon the flange 12 of the lower ring, as best shown in Fig. 3. When the pan is thus placed in position, the upper ends of the several braces 14 are bent downward over the same, as best shown in Fig. 3, whereby the pan is prevented from leaving the frame when suspended or turned upside down.

The handle 15, at or near the upper ring, 13, is struck out to form the lug 17, which lug is bent over upon the pan in similar manner to the upper extremity of the aforesaid braces 14. The pan is provided upon opposing sides with pin-like projections 18, formed upon the inner face.

In operation, when the pan is placed upon or over the fire, the body 16 may be revolved at will by engaging the pins 18 with a fork or other convenient article.

As the pins are on the inner side of the pan below the ends of the braces, they will not interfere with the revolution of the pan. The contents of a frying-pan rarely more than cover its bottom, so that the pins 18 would be exposed at all times.

It will be seen from the foregoing description and the accompanying drawings that the frying-pan will revolve at the slightest touch, thereby bringing the fire over which it is set in the process of cooking to bear upon the center and all parts of the pan essentially at the same time, while the handle of the pan, which is attached to the frame, need never be relinquished from the hand, thereby economizing space, as the common frying-pan with its long handle has to be continually swung around the stove, and is always in the way and curtails the space for other utensils on the stove or range. The pan as above constructed insures even cooking. If in practice it is found desirable, the upper ring may be omitted and the pan be held in the lower rings by braces 14.

The inwardly-extending flange of the lower ring, 11, raises the pan 16, so that it will not contact with the top of the stove, an intervening air-space being formed, thereby preventing the contents of the pan from scorching.

Having thus described my invention, what I claim as new, and desire to secure by Letters Patent, is—

1. A frying-pan comprising a bottomless frame provided with a handle and a handleless pan freely revoluble within the said frame, substantially as set forth.

2. As an improved article of manufacture, a frying-pan or similar utensil consisting of a lower flanged ring and an upper spaced and larger ring, braces uniting said rings and a revoluble handleless pan-like body resting on the inwardly-extending flange of the lower ring, substantially in the manner and for the purpose specified.

3. In a frying-pan or similar article, the combination, with a skeleton frame, of a handleless pan provided with projections on its inner surface revolubly held in said frame, substantially as and for the purpose specified.

4. In a frying-pan or similar utensil, the combination, with a skeleton frame consisting of a lower flanged ring, an upper, larger, and spaced ring, vertical braces uniting the said rings, having their upper extremity bent at an angle downward and inward, and a handle also attached to the several rings, of a revoluble handleless pan-like body resting upon the flange of the lower ring and held in position by the upper extremities of the said braces, substantially as and for the purpose specified.

5. In a frying-pan, the combination, with a skeleton frame consisting of spaced rings of different diameters, braces uniting said rings, having their outer extremities bent downward and inward, and a handle also attached to said rings, provided with an inwardly and downwardly projecting lug, of a pan-like body held to revolve within the frame, provided with pin-like projections upon the inner face, all arranged to operate substantially in the manner and for the purpose specified.

EMMA L. FARRELL.

Witnesses:
 J. F. ACKER, Jr.,
 WILLIAM J. FERGUSON.